United States Patent
Cheng et al.

(10) Patent No.: US 9,665,830 B2
(45) Date of Patent: May 30, 2017

(54) FEEDBACK-DRIVEN EXOGENOUS FACTOR LEARNING IN TIME SERIES FORECASTING

(71) Applicants: Yu Cheng, Shanghai (CN); Xingtian Shi, Shanghai (CN); Wen-Syan Li, Fremont, CA (US)

(72) Inventors: Yu Cheng, Shanghai (CN); Xingtian Shi, Shanghai (CN); Wen-Syan Li, Fremont, CA (US)

(73) Assignee: SAP SE, Walldorf (DE)

( * ) Notice: Subject to any disclaimer, the term of this patent is extended or adjusted under 35 U.S.C. 154(b) by 402 days.

(21) Appl. No.: 14/341,525

(22) Filed: Jul. 25, 2014

(65) Prior Publication Data

US 2016/0026930 A1    Jan. 28, 2016

(51) Int. Cl.
  *G06F 17/00*  (2006.01)
  *G06F 17/20*  (2006.01)
  *G06N 99/00*  (2010.01)

(52) U.S. Cl.
  CPC .................................. *G06N 99/005* (2013.01)

(58) Field of Classification Search
  USPC ......................................................... 706/11
  See application file for complete search history.

(56) References Cited

U.S. PATENT DOCUMENTS

| | | | |
|---|---|---|---|
| 7,447,723 B2 | 11/2008 | Perng et al. | |
| 7,580,852 B2 | 8/2009 | Ouimet et al. | |
| 8,341,007 B2 | 12/2012 | Moessner | |
| 8,742,959 B1 | 6/2014 | Efros et al. | |
| 8,744,888 B2 * | 6/2014 | Li | G06Q 40/02 705/35 |
| 8,874,561 B2 | 10/2014 | Heinzel et al. | |
| 8,971,313 B2 * | 3/2015 | Cheng | H04L 29/1216 370/352 |
| 9,141,581 B2 * | 9/2015 | Sun | G06F 17/00 |

(Continued)

OTHER PUBLICATIONS

Univariate time series prediction of solar power using a hybrid wavelet-ARMA-NARX prediction method H. Nazaripouya; B. Wang; Y. Wang; P. Chu; H. R. Pota; R. Gadh 2016 IEEE/PES Transmission and Distribution Conference and Exposition (T&D) Year: 2016 pp. 1-5, DOI: 10.1109/TDC.2016.7519959 IEEE Conference Publications.*

(Continued)

*Primary Examiner* — Michael B Holmes
(74) *Attorney, Agent, or Firm* — Brake Hughes Bellermann LLP

(57) ABSTRACT

A system for forecast modeling includes at least one processor and at least one database that is operably coupled to the at least one processor. The database includes a time series data module that is configured to store time series data for a domain, an exogenous data module that is configured to store exogenous data associated with multiple exogenous factors and a feedback module that is configured to collect and store feedback data from multiple online users, where the feedback data is related to the exogenous data and the exogenous factors. The system includes a data pre-processor module that is configured to use the at least one processor to identify and select a portion of the exogenous factors using the feedback data collected from the online users for use in a forecast model in combination with the time series data for the domain.

19 Claims, 6 Drawing Sheets

(56) References Cited

U.S. PATENT DOCUMENTS

| | | | | |
|---|---|---|---|---|
| 9,224,121 B2* | 12/2015 | Li | ............. | G06Q 10/087 |
| 9,230,226 B2* | 1/2016 | Li | ............. | G06Q 10/0631 |
| 9,380,107 B2* | 6/2016 | Li | ............. | G06N 3/126 |
| 2006/0010142 A1 | 1/2006 | Kim et al. | | |
| 2008/0319878 A1 | 12/2008 | Glebe et al. | | |
| 2010/0005046 A1* | 1/2010 | Segel | ............. | H04L 67/28 |
| | | | | 706/46 |
| 2010/0076816 A1* | 3/2010 | Phillips | ............. | G06Q 10/00 |
| | | | | 705/7.32 |

OTHER PUBLICATIONS

Web Service Recommendation Based on Time Series Forecasting and Collaborative Filtering Yan Hu; Qimin Peng; Xiaohui Hu; Rong Yang 2015 IEEE International Conference on Web Services Year: 2015 pp. 233-240, DOI: 10.1109/ICWS.2015.40 IEEE Conference Publications.*

Application of time series auto regressive model in price forecast Yang Zhao; Lei Shen 2011 International Conference on Business Management and Electronic Information Year: 2011, vol. 4 pp. 768-771, DOI: 10.1109/ICBMEI.2011.5921078 IEEE Conference Publications.*

Kernel Auto-Regressive Model with eXogenous Inputs for Nonlinear Time Series Prediction Venkataramana B. Mini; C. Chandra Sekhar Computing: Theory and Applications, 2007. ICCTA '07. International Conference on Year: 2007 pp. 355-360, DOI: 10.1109/ICCTA.2007.80 IEEE Conference Publications.*

* cited by examiner

| Column Name | Description |
|---|---|
| Time Series ID | Unique ID for the time series to be processed |
| Time | $t$, can be represented by any time-related unit, such as hour, day, month |
| Value | $y(t)$, can be represented by time associated variables, such as sales volume, price |

300

302 — Time Series ID
304 — Time
306 — Value

FIG. 3

| Column Name | Description |
|---|---|
| Locale ID | The unique locale (e.g., city, chain store) for the factor sampling |
| Factor Name | The unique name of exogenous factor |
| Time | Time stamp of the factor sampling |
| Value | Value of the factor sampling |

400

402 — Locale ID
404 — Factor Name
406 — Time
408 — Value

| Column Name | Description |
|---|---|
| 502 — Locale ID | The unique locale (e.g., city, chain store) for the factor sampling |
| 504 — Feedback ID | The unique ID of feedback |
| 506 — Time | Time stamp of the feedback |
| 508 — Time Series ID | The unique ID for the time series to be processed |
| 510 — Factor Name | The unique name of exogenous factor |
| 512 — Label | Feedback (e.g., positive or negative) to each exogenous factor |

FIG. 5

FEEDBACK-DRIVEN EXOGENOUS FACTOR LEARNING IN TIME SERIES FORECASTING

TECHNICAL FIELD

This description relates to feedback-driven exogenous factor learning in time series forecasting.

BACKGROUND

Time series forecasting is a widely utilized technique to make predictions based on historical time-ordered data. For example, time series forecasting may be used in various industries such as supply and demand in supply chain management, sales forecast in retail industry and traffic analysis in transportation management.

Time series forecast models may use historical values (e.g., main time series data) as well as exogenous factors such as weather, holidays, promotion information, etc. The number of potential exogenous factors that could be used in a forecast model may be numerous. The selection of the most relevant exogenous factors for use in the forecast model may be desirable to enable an accurate forecast.

SUMMARY

According to one general aspect, a system for forecast modeling includes at least one processor and at least one database that is operably coupled to the at least one processor. The database includes a time series data module that is configured to store time series data for a domain, an exogenous data module that is configured to store exogenous data associated with multiple exogenous factors and a feedback module that is configured to collect and store feedback data from multiple online users, where the feedback data is related to the exogenous data and the exogenous factors. The system includes a data pre-processor module that is configured to use the at least one processor to identify and select a portion of the exogenous factors using the feedback data collected from the online users for use in a forecast model in combination with the time series data for the domain.

Implementations may include one or more of the following features. For example, the feedback data may include positive feedback data and negative feedback data for each of the exogenous factors and the data pre-processor module may be configured to select the portion of the exogenous factors for use in the forecast model when a ratio of positive feedback to negative feedback for an exogenous factor exceeds a threshold. The processor may be configured to send an online questionnaire to the online users to obtain the feedback data in response to a triggering event. The processor may be configured to send an online questionnaire to the online users to obtain the feedback data in response to a period of time related to the domain.

The system may include an auto regressive exogenous (ARX) model module that is operably coupled to the at least one processor and that is configured to create an ARX model and to use the at least one processor to represent coefficients of the selected portion of exogenous factors as a function of input variables in the ARX model. The ARX model includes a linear portion and a fuzzy network portion, where at least a portion of coefficients of the linear portion is represented by results from the fuzzy network portion.

In one example implementation, the database includes an in-memory database.

In another general aspect, a computer-implemented method includes quantizing and normalizing exogenous factors, collecting and storing feedback data from online users related to the exogenous factors and selecting a portion of the exogenous factors using the feedback data collected from the online users for use in a forecast model.

In another general aspect, a computer program product is tangibly embodied on a non-transitory computer-readable storage medium and includes instructions that, when executed by at least one computing device, are configured to cause the at least one computing device to quantize and normalize exogenous factors, collect and store feedback data from online users related to the exogenous factors and select a portion of the plurality of exogenous factors using the feedback data collected from the online users for use in a forecast model.

The details of one or more implementations are set forth in the accompanying drawings and the description below. Other features will be apparent from the description and drawings, and from the claims.

BRIEF DESCRIPTION OF THE DRAWINGS

FIG. 3 is an example table of time series data.

FIG. 4 is an example table of exogenous data.

FIG. 5 is an example table of feedback data.

DETAILED DESCRIPTION

This document describes systems and techniques for feedback-driven exogenous factor learning for time series forecasting. Feedback is collected and stored from a large group of people, for example, a large group of people from an online community. The collected feedback is related to the exogenous data and exogenous factors that may be used in forecast models. The feedback is used to identify and select the exogenous factors to be used in a forecast model. In this manner, the number of potential exogenous factors that could be used in a forecast model is narrowed down based on the feedback received from the large group of people. The system learns the best exogenous factors to use without searching the whole feature space by utilizing the feedback from the large group of people from an online community.

This document also describes systems and techniques for a time series forecast model that uses the exogenous factors identified by the feedback. In one example implementation, the time series forecast model includes a time varying Auto Regressive Exogenous (ARX) model, where coefficients of the exogenous factors in the model are represented as a function of input variables. The systems and techniques described eliminate or reduce the domain knowledge needed for different time series forecasting problems, which may save cost and reduce the response time of building the model.

Figure 1:
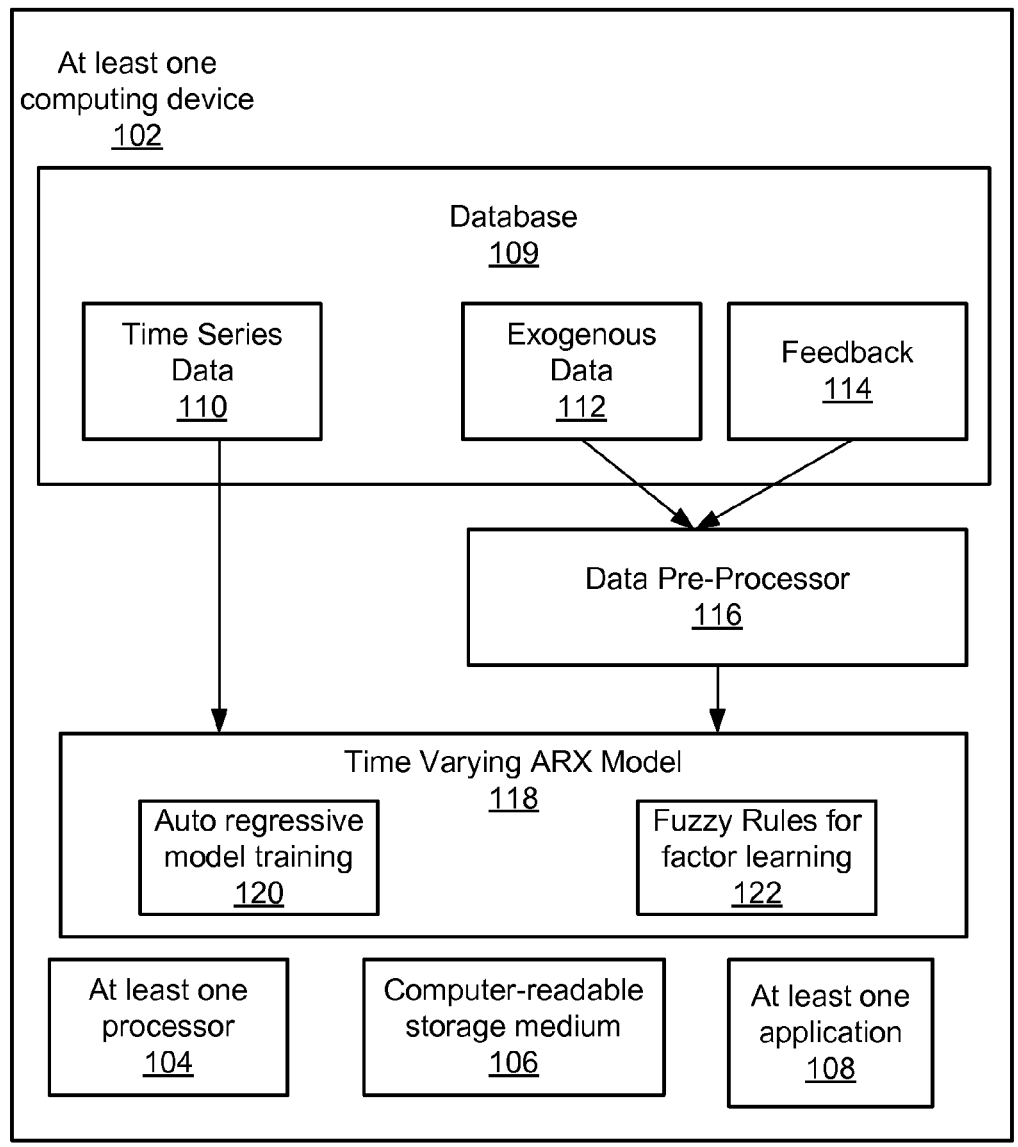
FIG. 1 is a block diagram of a system for feedback driven exogenous factor learning for time series forecasting.

FIG. 1 is a block diagram of a system 100 for feedback driven exogenous factor learning for time series forecasting. The system 100 includes at least one computing device 102. The at least one computing device 102 includes at least one processor 104, a non-transitory computer-readable storage medium 106, and at least one application 108. The computing device 102 may include any type of computing device including, for example, a server, a blade server, a desktop, a laptop, or any other computing device. The computing device 102 may include multiple computing devices, such as, multiple servers, that are operably coupled and configured to host the components of the system across the multiple computing devices. The computing device 102 may be networked to other computing devices (not shown) such that the systems on the computing device 102 may send and receive information across a network (not shown), such as the Internet, a wide area network and/or a local area network.

Thus, the at least one processor 104 may represent two or more processors executing in parallel, and a non-transitory computer-readable storage medium 106 may represent virtually any non-transitory medium that may be used to store instructions for executing the components of system 100, including the at least one application 108. Multiple processors also may be referred to as multi-core processors or multi-processor core environment. The processor 104 may be a hardware processor, including a micro-processor.

The system 100 includes a database 109, a data pre-processor 116 and a time varying ARX model 118. The database 109 may include any type of database that is configured to store one or more tables and/or data. In one example implementation, the database 109 may include a relational database. In another example implementation, the database 109 may include an in-memory database.

The database 109 is configured to collect data and to store the data for later use by the data pre-processor 116 and in the time varying's ARX model 118. The database 109 may include one or more tables or other data structures to store data. The database 109 includes one or more tables of time series data 110, one or more tables of exogenous data 112, and one or more tables of feedback 114.

The time series data 110 includes data that is collected along with the time for the collected data. There are many examples of different types of time series data that may be collected in different types of domains. For example, time series data may be collected in various industries such as supply and demand in supply chain management, sales forecast in retail industry, traffic analysis in transportation management and energy usage in the energy domain. For instance, in the retail industry, time series data may be collected to record the sales volume of a particular item on each day. In the energy industry, time series data may be collected to record the amount of energy used and/or distributed each day in a certain location. The time series data 110 represents the historical collection of data for a particular item as represented during a particular period of time.

Referring also to FIG. 3, an example table 300 illustrates a table of time series data. The table 300 may be one illustration of a schema for the time series data 110 of FIG. 1. Other schemas and representations are possible. The table 300 may include multiple columns including, for example, a time series identifier (ID) 302, a time 304, and a value 306.

The time series identifier 302 is the unique identifier (ID) for the time series to be processed. The time 304 is the period of time for which the time series is collected. The time 304 can be represented by any time-related unit such as an hour, a day, a month, or any other time related unit. The time 304 may be represented by the variable t.

The value 306 can be represented by time associated variables. For example, in the retail domain, the value 306 may be represented by variables such as sales volume or price. In other domains, the value 306 may be represented by other domain-related variables. The value 306 may be represented by the variable y(t). The data in the table 300 may be used to forecast related time series data at some point in the future. For example, the data in table 300 may be used to forecast a sales volume for an item at some point in the future.

Referring back to FIG. 1, the time series data 110 may be used to forecast a time series y(t) according to its historical data y(t−1), y(t−2), . . . y(t−$n_y$) by means of forecast modelling and training. In addition to the time series data 110 that may be used to forecast a time series, a number of exogenous factors that also affect the time series, may be used. The exogenous factors may affect the time series either explicitly or implicitly and, therefore, should be involved in the modelling process. In this manner, exogenous data 112 is also collected and stored in the database 109.

The exogenous data 112 includes all the information collected from multiple sources that may affect the time series in both explicit and implicit manners. For example, in sales forecasting, the daily sales volume is varied not only according to the intrinsic system dynamics, but also may be affected by multiple exogenous factors. The exogenous factors may include factors such as temperature difference, national holidays, weather, promotion information, and other additional factors. The number of exogenous factors may almost be unlimited in real life because every observation could be treated as an exogenous factor.

Referring also to FIG. 4, the exogenous data 112 may be stored in an example table such as table 400. Table 400 is one example schema to organize and store the exogenous data. Other schemas are possible. The table 400 includes multiple columns such as the locale identifier 402, the factor name 404, the time 406, and the value 408. Many exogenous factors are also time series data since they vary along time. The table 400 may collect and store many possible exogenous factors that may be important to a particular time series data domain.

The locale identifier 402 includes the unique locale for the factor sampling. For example, the unique locale may be the location such as a city or town for a particular chain store in the retail industry. The factor name 404 is the unique name of the exogenous factor. The time 406 is the timestamp of the factor sampling. The value 408 is the value of the factor sampling.

Referring back to FIG. 1, the exogenous data 112 may be represented by the variable x(t). The exogenous factors may be used in the forecast model along with the historical time series data 110. Specifically, more than one exogenous factor, $x_1(t), x_2(t), \ldots, x_n(t)$ may be included in the forecast model because these factors either explicitly or implicitly affect the modelling process.

The exogenous data 112 may be collected from various sources and input into the database 109. The database 109 may receive the collected exogenous data 112 and store it in one or more tables, for example, as described with respect to FIG. 4.

While data for many different exogenous factors may be collected and stored, only a subset of the exogenous data may be relevant to a particular forecast model. Thus, it may be advantageous to select the most relevant exogenous factors for use in a particular forecast model. The feedback 114 may be used to determine which exogenous factors to use in a particular forecast model.

The feedback data 114 denotes the feedback collected from people to indicate which exogenous factors indeed affect and cause the transaction or activity from a perspective of the collective users. In one example implementation, the database 109 may collect and store the exogenous data 112 either from some predefined factor repository or from other sources including for example the Internet. The database 109 may analyze the information using various different techniques including event detection and natural language processing. Based on the system analysis, feedback questionnaires may be distributed in some manner to multiple different users. The feedback questionnaires may be distributed to many multiples of people and the answers to the questionnaires may be collected as the feedback data 114, which then may be used to determine the relevant exogenous data 112 to use in a particular forecast model.

In one implementation, a triggering event may occur in a particular time series domain. The occurrence of the triggering event may trigger the computing device 102 to send an online questionnaire to online users to obtain the feedback data in response to the triggering event. In this manner, feedback data may be collected in the form of the responses to the questionnaire in order to find out the relevant exogenous factors related to the triggering event in the domain.

The database 109 also may store information related to the online user including relevant contact information to send out the online questionnaire to the users. In other implementations, the computing device 102 may network with another device to receive the user information to send the online questionnaire.

In another example implementation, the computing device 102 in cooperation with the database 109 may periodically trigger the sending of a questionnaire (e.g., an online questionnaire) to online users related to a particular domain. For instance, in the retail industry domain, an online questionnaire may be sent out periodically to purchasers (or new purchasers) of an item to elicit feedback on reasons affecting the user's decision to purchase the item.

In this manner, the feedback data 114 is a collection of answers from a large group of users for example a large group of online users. The feedback questionnaires may be directed to the different potential exogenous factors. The answers to the questions may be in different forms. For example, the questions may be formed to elicit binary responses. For example, the answers to the questions, which are the feedback data 114, may be binary data such as a positive or negative answer.

The feedback data also may be a specific value on a scale of values. For instance, the feedback data may solicit a particular number or ranking on a scale. The scale may be a scale of any range including, for example, a scale of 1 to 10 or a scale of 1 to 100 or any other type of range for a scale, as may be deemed appropriate. The solicited value may represent the importance from the perspective of a user for a particular exogenous factor, where a higher number on the scale may represent a more important factor and a lower number on the scale may represent a less important factor on the scale.

For example, in a retail forecasting model, customers may select some exogenous factors and label the factor as positive when the factor was a reason for making the purchase. On the other hand, the customer may label the exogenous factor as negative when the factor was not a reason for making the purchase. The positive and negative answers are collected and stored as the feedback data 114.

In a similar manner with scaled feedback data, for example, in a retail forecasting model, customers may select a value on a scale having a range of values. The customer may select a larger value when the factor was a more influential reason for making the purchase. On the other hand, the customer may select a smaller value when the factor was a less influential reason for making the purchase.

Referring also to FIG. 5, an example table 500 illustrates a schema for storing the feedback data 114 in the database 109. Other schemas are possible and may be used. The feedback data may be related to a particular time series or to a particular item or product. The feedback data may be the responses that people provide in response to a list of exogenous factors where the responses are the labels assigned by the people.

The table 500 may include a locale ID 502, a feedback ID 504, a time 506, a time series ID 508, a factor name 510, and a label 512. The locale ID 502 is the unique locale for the factor sampling. For example, the unique locale may be a location such as a city, town, county or state or other geographic location. In the retail domain, the unique locale may be a specific store such as a chain store or group of stores in a certain geographic area.

The feedback ID 504 is the unique ID of the feedback. The time 506 is the timestamp of the feedback. The time series ID 508 is the unique ID for the time series to be processed. The factor name 510 is the unique name of the exogenous factor.

The label 512 is the feedback from the user to each exogenous factor. The label 512 is the answer provided by the user in response to the query or question here asking for the feedback. In this manner, the feedback collected can be associated with a particular time series ID, a particular time and a particular feedback.

As discussed above, the label 512 may be in various forms. For example, the label 512, which is the feedback from the user, may be a binary response. The binary response may simply be positive or negative with respect to a particular exogenous factor. The table 500 may aggregate all of the positive and negative feedback for each particular exogenous factor.

Other formats or expressions of the feedback for the label 512 also may be received. For instance, as discussed above, a value on a scale may be recorded as the label 512 for a particular exogenous factor. In one implementation, the value may be on a scale from 1 to 10. In another implementation, the value may be on a different scale such as, for example, on a scale from 1 to 100. As discussed above, other ranges on a scale are also may be used.

Referring back to FIG. 1, the exogenous data 112 and the feedback data 114 may be processed by the data pre-processor 116. The data pre-processor 116 is configured to receive the exogenous data 112 and the feedback data 114 as input. The data pre-processor 116 is configured to identify and select one or more of the exogenous factors using the feedback data 114 for use in a forecast model in combination with the time series data 110. In this manner, the feedback data 114 is used to identify and select which of the multiple exogenous factors should be used in the forecast model because they are the most relevant as determined by a large group of people.

In one example, the feedback data 114 may be collected from online users as part of a questionnaire or survey that is communicated to the online users. Depending on the particular domain of the forecast model, the feedback data 114 also may be collected by other means including at a point of sale, either an online sale or typical retail sale where the customer may be prompted to provide feedback on reasons a purchase was made either at a time of the sale or at a later time. The customer feedback is collected and stored in the feedback data 114.

One benefit of collecting the feedback data 114 from online users is that a large number of responses may be collected such that the feedback provides a meaningful sample that can be used to determine which ones of the many possible exogenous factors are the most relevant to use in the forecast model.

As such, the data pre-processor may be used to quantify and scale the exogenous factors using the feedback 114. The data pre-processor 116 is used to normalize the factors in order to identify and select which factors should be used in the forecast model. By normalizing all of the exogenous factors and the feedback associated with each of the exogenous factors, the data pre-processor 116 can evaluate the factors in the same manner.

The data pre-processor 116 may determine which factors to select in a number of different ways. For example, in one implementation, the data pre-processor 116 may analyze each factor and select the ones that have been determined to be most relevant as determined by the large group of people. One way to is to take a ratio of the positive feedback relative to the negative feedback. The exogenous factors having the highest ratios may be selected for use in the forecast model. In one example, the data pre-processor 116 may select the exogenous factors with the highest ratio as long as the ratio meets or exceeds a predetermined and/or configurable threshold ratio.

In another example implementation, the data pre-processor 116 may select the exogenous factors having the highest value on a particular scale. For instance, if people were asked to rate a particular factor using a scale, the data pre-processor 116 may average the responses to determine the average value on the scale and compare the average values for each of the exogenous factors. The exogenous factors having the highest averages may be selected for use in the forecast model. In one example, the data pre-processor 116 may select the exogenous factors with the highest averages as long as the average meets or exceeds a predetermined and/or configurable threshold average.

In order to incorporate the feedback-driven exogenous factors in the modeling, a time varying ARX model 118 (or simply ARX model 118) is established, where coefficients of the exogenous factors in the model are represented as a function of input variables. This is in contrast to a typical ARX model, where these coefficients are constants and are not represented as a function of input variables.

The results from the data pre-processor 116 and the time series data 110 are used as input to the ARX model 118. The ARX model 118 receives the input from the data pre-processor 116 and the time series data 110.

Figure 6:
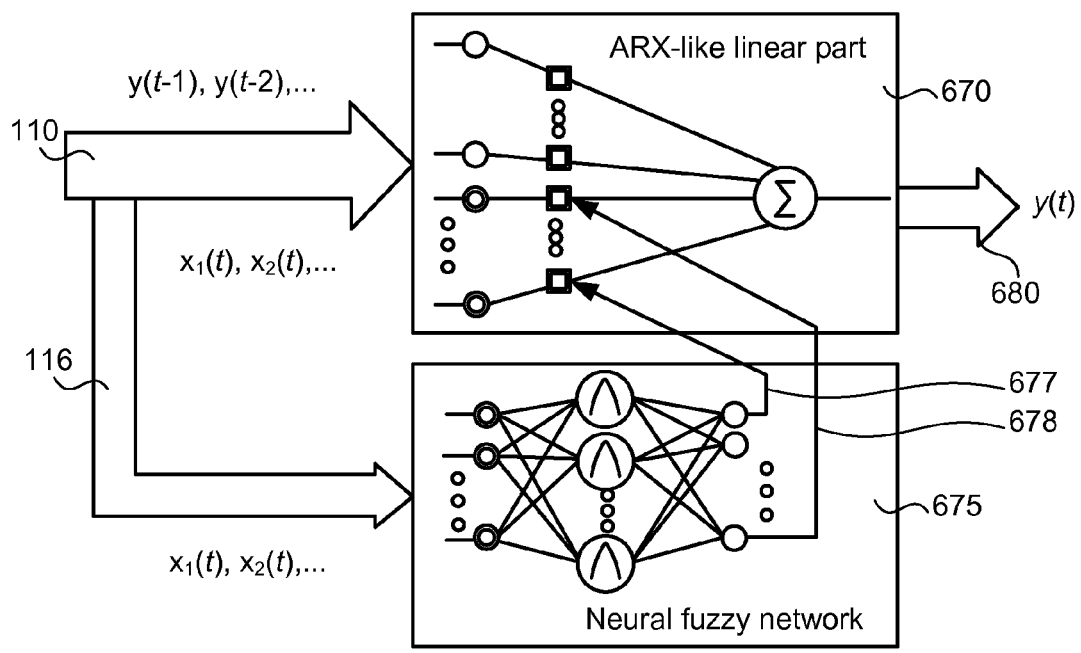
FIG. 6 is an example time-varying ARX model.

Referring also to FIG. 6, an example block diagram of an ARX model 600 is illustrated. The ARX model 600 includes an ARX-like linear part 670 and a neural fuzzy network 675. The time series data 110 represented by y(t−1), y(t−2) . . . is input into the ARX-like linear part 670. The output of the data pre-processor 116, which includes the selected exogenous data 112 represented by $x_1(t)$, $x_2(t)$ . . . is input into both the ARX-like linear part 670 and the neural fuzzy network 675.

In this way, the feedback-driven exogenous factors are utilized to form some linguistic fuzzy rules by means of the neural fuzzy network 675. The feedback data used to select a subset of the exogenous factors by the data pre-processor 116 helps prevent the ARX Model 118 from becoming over-fit, which can occur if too many fuzzy rules are generated from the neural fuzzy network. The selection of the subset of exogenous factors to use is useful to reduce unnecessary rules and improve generalization of the model.

The neural fuzzy network 675 processes the exogenous data input 116. The output 677 and 678 of the neural fuzzy network 675 includes time-varying coefficients that are used as input for the ARX-like linear part 675. The ARX-like linear part 675 processes these inputs and outputs a forecasted time series 680 represented by y(t).

From a mathematical perspective, this model can be represented as shown in Equation 1 as:

$$y(t) = \Phi^T(t)\Theta(t) + e(t) \quad \text{Equation (1)}$$

where $\Theta(t) = [\theta_1, \theta_2, \ldots, \theta_{n_y}, \xi_1(t), \xi_2(t), \ldots, \xi_n(t)]^T$. It can further be reformed according to the ARX model 600 as:

$$y(t) = \Phi_L^T(t)\Theta_L + \Phi_x^T(t)\Theta_x(t) \quad \text{Equation (2)}$$

where $\Phi_L(t) = [y(t-1), y(t-2), \ldots, y(t-n_y)]^T$ denotes time series auto regressive input variables, $\Phi_x(t) = [x_1(t), x_2(t), \ldots, x_n(t)]^T$ denotes exogenous inputs, and $\Theta_L = [\theta_1, \theta_2, \ldots, \theta_n]^T$ is a constant vector. $\Theta_x(t) = [\xi_1(t), \xi_2(t), \ldots, \xi_n(t)]^T$ is represented by a neural fuzzy network as:

$$\Theta_x(t) = \Omega_0 + \sum_{j=1}^{M} \Omega_j \mathcal{N}_j(\Phi_x(t)) \quad \text{Equation (3)}$$

where $$\mathcal{N}_j(\Phi_x(t)) = \frac{\prod_{k=1}^{n} \mu_{A_k^j}(x_k(t))}{\sum_{j=1}^{M}\left(\prod_{k=1}^{n} \mu_{A_k^j}(x_k(t))\right)}, \quad \text{Equation (3)}$$

$$j = 1, 2, \ldots, M.$$

In Equation 4, $A_k^j$ denotes the fuzzy set of $x_k(t)$. The membership function can be implemented in different ways, for example, a Gaussian function can be used as the membership function in adaptive fuzzy system to form fuzzy rules, which is represented as:

$$\mu_{A_k^j}(x_k(t)) = \exp\left[-\frac{1}{2}\left(\frac{x_k(t) - \overline{x}_k^j}{\sigma_k^j}\right)^2\right]$$

where $x_k^j$, $\sigma_j$ are center and width parameters of the Gaussian function. In this way, the neural fuzzy network 675 corresponds to a set of linguistic fuzzy rules which can be represented in the following form:

$R_j$: If $x_1(t)$ is $A_1^j$ and $x_2(t)$ is $A_2^j$ and . . . $x_n(t)$ is $A_n^j$, THEN y(t) is $B^j$.

Figure 2:
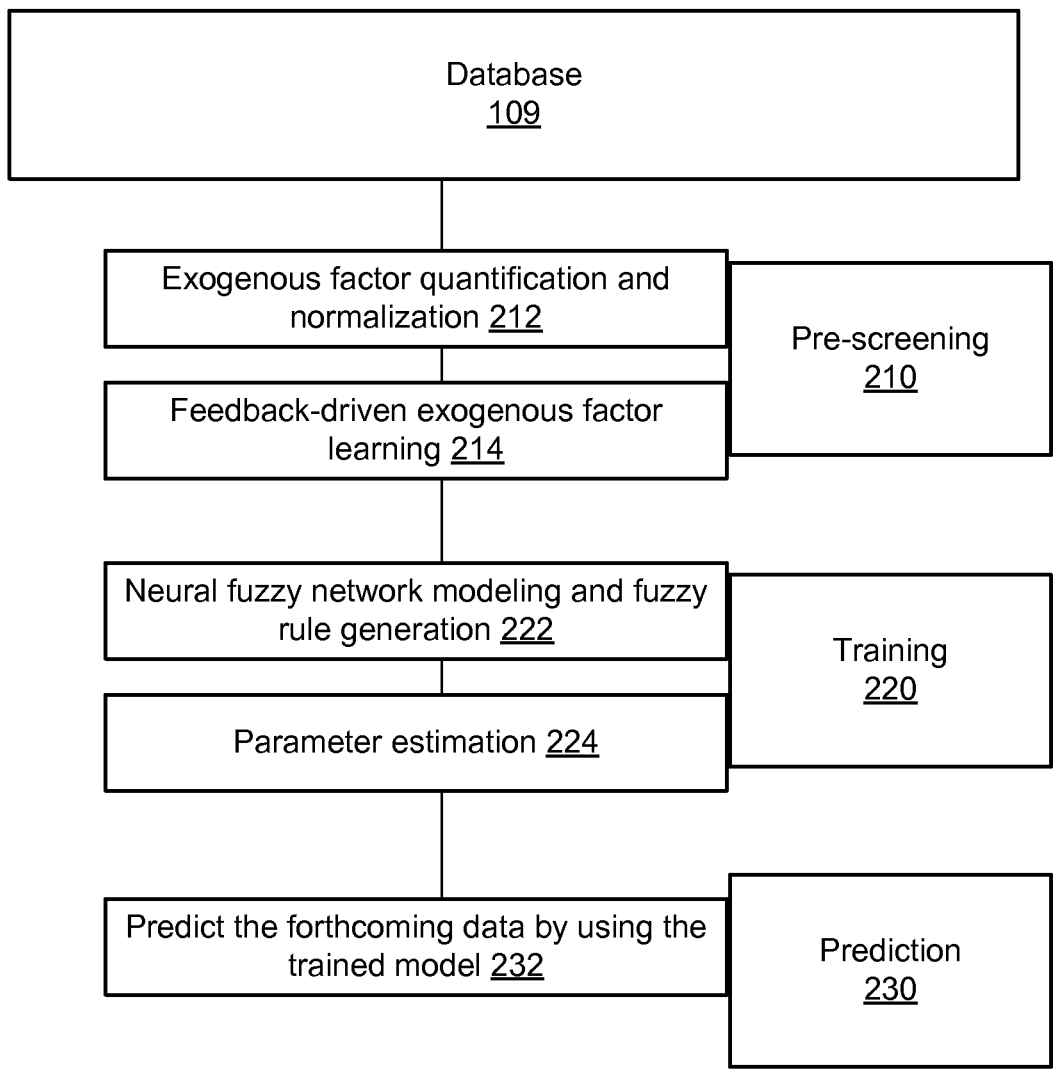
FIG. 2 is a flowchart illustrating example operations of the system of FIG. 1.

Referring to FIG. 2, an example flowchart illustrates an example process 200 for operations of the system 100 of FIG. 1. The process 200 may be divided into different portions including pre-screening 210, training 220 and prediction 230. In the pre-screening portion 210, the exogenous factors are quantified and normalized (212). As discussed above, the exogenous data 112 is collected and stored in the database 109. The data pre-processor 116 then quantifies and normalizes the exogenous factors (212).

The pre-screening portion 210 also includes determining which of the exogenous factors to use based on the feedback-driven exogenous factor learning (214). For example, the online user feedback data 114 is collected, where the feedback data 114 includes input from many users regarding the relevance of different exogenous factors. The data pre-processor 116 uses the feedback data 114 to select which of the exogenous factors to use in the ARX model. In some implementations, only exogenous factors that meet and/or exceed a configurable threshold such that the relevant exogenous factors are selected for use in the ARX model.

In pre-screening 210, the selected exogenous factors are expressed by linguistic fuzzy rules. For example, if PM 2.5 is selected, which has already been quantified and normalized between 0 and 1, some corresponding membership sets could be defined as:

PM is heavy: if PM 2.5 index is larger than 0.6;
PM is middle: if PM 2.5 index is between 0.3 and 0.6; and
PM is light: if PM 2.5 index is smaller than 0.3.

In this way, the exogenous factors could be expressed in a fuzzy manner and input into the ARX model as part of the next portion of the process 200.

Process 200 also includes training an ARX model (220). Training the ARX model (220) includes modeling the neural fuzzy network and generating the fuzzy rules (222). For example, the selected exogenous factors are input into the ARX model 600 of FIG. 6 into the neural fuzzy network 675, where the modeling occurs and the fuzzy rules are generated.

Training the ARX model (220) also includes estimating the parameters (224). In the model training processing (220), the parameters to be estimated becomes $\Theta_L$, which is the linear parameters of the AR part and $\Omega_j$, j=0, 1, 2, . . . , M from Equation 3.

According to Equation 1 and Equation 3, the model can be reformed as:

$$y(t) = \Psi^T(t)\Xi + e(t) \quad \text{Equation (5)}$$

in which $$\psi(t) = [\Phi_L^T(t), \Phi_x^T(t), \Phi_L^x(t)\mathcal{N}_1(\Phi_x(t)), \ldots \Phi_x^T(t)\mathcal{N}_M(\Phi_x(t))]^T \quad \text{Equation (6)}$$

$$\Xi = [\Theta_L, \Omega_0, \Omega_1, \ldots \Omega_M]^T \quad \text{Equation (7)}$$

When the exogenous factors are determined and refined, the term of $\mathcal{N}_j(\Phi_x(t))$, j=1, 2, . . . , M can be obtained according to Equation 4. In this way, Equation 5 becomes a linear-in-parameter model, therefore the parameter vector $\Xi$ could be obtained by a least square method, such as a recursive least square algorithm. In this manner, the parameters of the model are trained by iteration.

The process 200 includes predicting the future time series data (230). Predicting the future time series data (230) includes predicting the forthcoming data by using the results from the trained model from the training process (220). From Equations 6 and 7, the prediction results is known from three parts: auto regression of time series, feedback-driven exogenous factors and some fuzzy rules based interpolation. In this manner, the prediction of the future time series data (230) obtains a more accurate result through the use of the exogenous factors that were selected based on the feedback data from the online users and from the use of the ARX model, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for forecast modeling, the system comprising:
at least one processor;
at least one database that is operably coupled to the at least one processor, wherein the database comprises:
a time series data module that is configured to store time series data for a domain,
an exogenous data module that is configured to store exogenous data associated with a plurality of exogenous factors, and
a feedback module that is configured to collect and store feedback data from a plurality of online users, wherein the feedback data is related to the exogenous data and the plurality of exogenous factors;
a data pre-processor module that is configured to use the at least one processor to identify and select a portion of the plurality of exogenous factors using the feedback data collected from the online users for use in a forecast model in combination with the time series data for the domain; and
an auto regressive exogenous (ARX) model module that is operably coupled to the at least one processor and that is configured to create an ARX model and to use the at least one processor to represent coefficients of the selected portion of exogenous factors as a function of input variables in the ARX model.

2. The system of claim 1 wherein:
the feedback data includes positive feedback data and negative feedback data for each of the plurality of exogenous factors; and
the data pre-processor module is configured to select the portion of the plurality of exogenous factors for use in the forecast model when a ratio of positive feedback to negative feedback for an exogenous factor exceeds a threshold.

3. The system of claim 1 wherein the at least one processor is configured to send an online questionnaire to the plurality of online users to obtain the feedback data in response to a triggering event.

4. The system of claim 1 wherein the at least one processor is configured to send an online questionnaire to the plurality of online users to obtain the feedback data in response to a period of time related to the domain.

5. The system of claim 1 wherein the ARX model comprises a linear portion and a fuzzy network portion, wherein at least a portion of coefficients of the linear portion is represented by results from the fuzzy network portion.

6. The system of claim 1 wherein the database comprises an in-memory database.

7. A computer-implemented method for executing instructions stored on a non-transitory computer-readable storage medium, the method comprising:
quantizing and normalizing a plurality of exogenous factors;
collecting and storing feedback data from a plurality of online users related to the plurality of exogenous factors; and
selecting a portion of the plurality of exogenous factors using the feedback data collected from the online users for use in a forecast model.

8. The method as in claim 7 wherein:
the feedback data includes positive feedback data and negative feedback data for each of the plurality of exogenous factors; and
selecting the portion of the exogenous factors comprises selecting the portion of the plurality of exogenous factors for use in the forecast model when a ratio of positive feedback to negative feedback for an exogenous factor exceeds a threshold.

9. The method as in claim 7 further comprising sending an online questionnaire to the plurality of online users to obtain the feedback data in response to a triggering event.

10. The method as in claim 7 further comprising sending an online questionnaire to the plurality of online users to obtain the feedback data in response to a period of time related to the domain.

11. The method as in claim 7 wherein the forecast model includes an auto regressive exogenous (ARX) model.

12. The method as in claim 11 wherein the ARX model comprises a linear portion and a fuzzy network portion, wherein at least a portion of coefficients of the linear portion is represented by results from the fuzzy network portion.

13. The method as in claim 11 further comprising representing coefficients of the selected portion of exogenous factors as a function of input variables in the ARX model.

14. The method as in claim 13 further comprising predicting a future time series data using historical time series data for a domain and the selected portion of the exogenous factors in the ARX model.

15. A computer program product, the computer program product being tangibly embodied on a non-transitory computer-readable storage medium and comprising instructions that, when executed by at least one computing device, are configured to cause the at least one computing device to:
quantize and normalize a plurality of exogenous factors;
collect and store feedback data from a plurality of online users related to the plurality of exogenous factors; and
select a portion of the plurality of exogenous factors using the feedback data collected from the online users for use in a forecast model.

16. The computer program product of claim 15 wherein the forecast model includes an auto regressive exogenous (ARX) model.

17. The computer program product of claim 16 wherein the ARX model comprises a linear portion and a fuzzy network portion, wherein at least a portion of coefficients of the linear portion is represented by results from the fuzzy network portion.

18. The computer program product of claim 16 further comprising instructions that, when executed by at least one computing device, are configured to cause the at least one computing device to represent coefficients of the selected portion of exogenous factors as a function of input variables in the ARX model.

19. The computer program product of claim 18 further comprising instructions that, when executed by at least one computing device, are configured to cause the at least one computing device to predict a future time series data using historical time series data for a domain and the selected portion of the exogenous factors in the ARX model.

* * * * *